(12) United States Patent
Kawanaka

(10) Patent No.: US 6,904,528 B1
(45) Date of Patent: Jun. 7, 2005

(54) ILLEGITIMATE DUPLICATION PREVENTING METHOD, DATA PROCESSING APPARATUS AND MEDICAL IMAGING APPARATUS

(75) Inventor: Tatsuo Kawanaka, Tokyo (JP)

(73) Assignee: GE Yokogawa Medical Systems, Limited, Tokyo (JP)

( * ) Notice: Subject to any disclaimer, the term of this patent is extended or adjusted under 35 U.S.C. 154(b) by 0 days.

(21) Appl. No.: 09/476,262

(22) Filed: Jan. 3, 2000

(51) Int. Cl.⁷ .............................. H04L 9/00; H04L 9/32; G06F 11/30; G06F 12/14; G06F 17/60; H04K 1/00
(52) U.S. Cl. .......................... 713/200; 713/191; 705/59
(58) Field of Search ................................ 713/200, 191; 705/59

(56) References Cited

U.S. PATENT DOCUMENTS 5,490,216 A * 2/1996 Richardson, III ............ 705/59
6,108,420 A * 8/2000 Larose et al. ................. 705/59

* cited by examiner

Primary Examiner—Gilberto Barrón Jr.
Assistant Examiner—Benjamin E. Lanier
(74) Attorney, Agent, or Firm—Moonray Kojima (57) ABSTRACT

In order to assuredly prevent illegitimate duplication of a program by a simple technique, license information 304 is created as information in the form of a run-time read module in a data processing apparatus by a creation program that self-destructs after being executed, and a program 300 that is installed without the license information and is incomplete without the license information is executed with the license information 304 read during the execution.

3 Claims, 5 Drawing Sheets

ILLEGITIMATE DUPLICATION PREVENTING METHOD, DATA PROCESSING APPARATUS AND MEDICAL IMAGING APPARATUS

BACKGROUND OF THE INVENTION

The present invention relates to an illegitimate duplication preventing method, data processing apparatus and medical imaging apparatus, and more particularly to a method of preventing illegitimate duplication of a program, and a data processing apparatus and medical imaging apparatus comprising means for preventing illegitimate duplication of a program.

A program in a data processing apparatus is protected by measures for preventing illegitimate duplication. One such technique is to make a program executable by a user writing specific information such as a product ID (identification) code into the program during installation of the program into the data processing apparatus. Another technique involves storing specific information input by a user into the data processing apparatus, and justifying the user by the program checking the information when it is executed.

Still other techniques include a method in which a flexible magnetic disk or the like that has key information stored in it is distributed along with a program and the program is configured so that it should always be used with the flexible magnetic disk, thereby ensuring that only a legitimate user, can use the program, and a method in which a specific hardware is distributed along with a program and the program is configured so that it becomes executable only when the hardware is incorporated into the data processing apparatus.

Among these conventional techniques, the method in which specific information is written into a program makes a change in a part of the program, and therefore the program may be corrupted due to a mistake or the like in writing the information, and in addition, the program does not have a function to avoid duplication after writing the information.

The method in which a program itself checks specific information written in the data processing apparatus requires a user to write complicated information, which is cumbersome, and a special processing procedure is needed in the program to interpret the information, thereby reducing efficiency.

On the other hand, the method involving concurrent use of a flexible magnetic disk has a problem that the information medium is not highly reliable, and the method involving concurrent use of a hardware increases costs and is more restricted in handling during distribution compared to programs or the like that can be distributed on-line via a network. Moreover, if the medium or the hardware is lost, the program cannot be used any more.

SUMMARY OF THE INVENTION

It is an object of the invention to provide an illegitimate duplication preventing method which assuredly prevents illegitimate duplication of a program by a simple technique, and a data processing apparatus and medical imaging apparatus comprising such illegitimate duplication preventing means.

In accordance with a first aspect of the invention, there is provided an illegitimate duplication preventing method comprising the steps of: creating license information as information in the form of a run-time read module in a data processing apparatus by a creation program that self-destructs after being executed; and executing a program that is installed in the data processing apparatus without the license information and is incomplete without the license information, with the license information read during the execution.

In accordance with a second aspect of the invention, there is provided a data processing apparatus comprising: license information creating means for creating license information as information in the form of a run-time read module by a creation program that self-destructs after being executed; and program executing means for executing a program that is installed without the license information and is incomplete without the license information, with the license information read during the execution.

In accordance with a third aspect of the invention, there is provided a medical imaging apparatus comprising medical image acquisition means for acquiring an image of a subject, image processing means for processing the image, and display means for displaying the processed image, wherein the image processing means comprises: license information creating means for creating license information as information in the form of a run-time read module by a creation program that self-destructs after being executed; and program executing means for executing a program that is installed without the license information and is incomplete without the license information, with the license information read during the execution.

According to the illegitimate duplication preventing method, data processing apparatus and medical imaging apparatus in the first through third aspects of the invention, a program itself reads license information during execution of the program, and then operates as a complete program. Since the program as installed lacks the license information, it does not act properly when duplicated. Since the license information is created by a self-destructive program, it cannot be created more than once.

The present invention thus provides an illegitimate duplication preventing method which assuredly prevents illegitimate duplication of a program by a simple technique, and a data processing apparatus and medical imaging apparatus comprising such illegitimate duplication preventing means.

Further objects and advantages of the present invention will be apparent from the following description of the preferred embodiments of the invention as illustrated in the accompanying drawings.

DETAILED DESCRIPTION OF THE INVENTION

Figure 1:
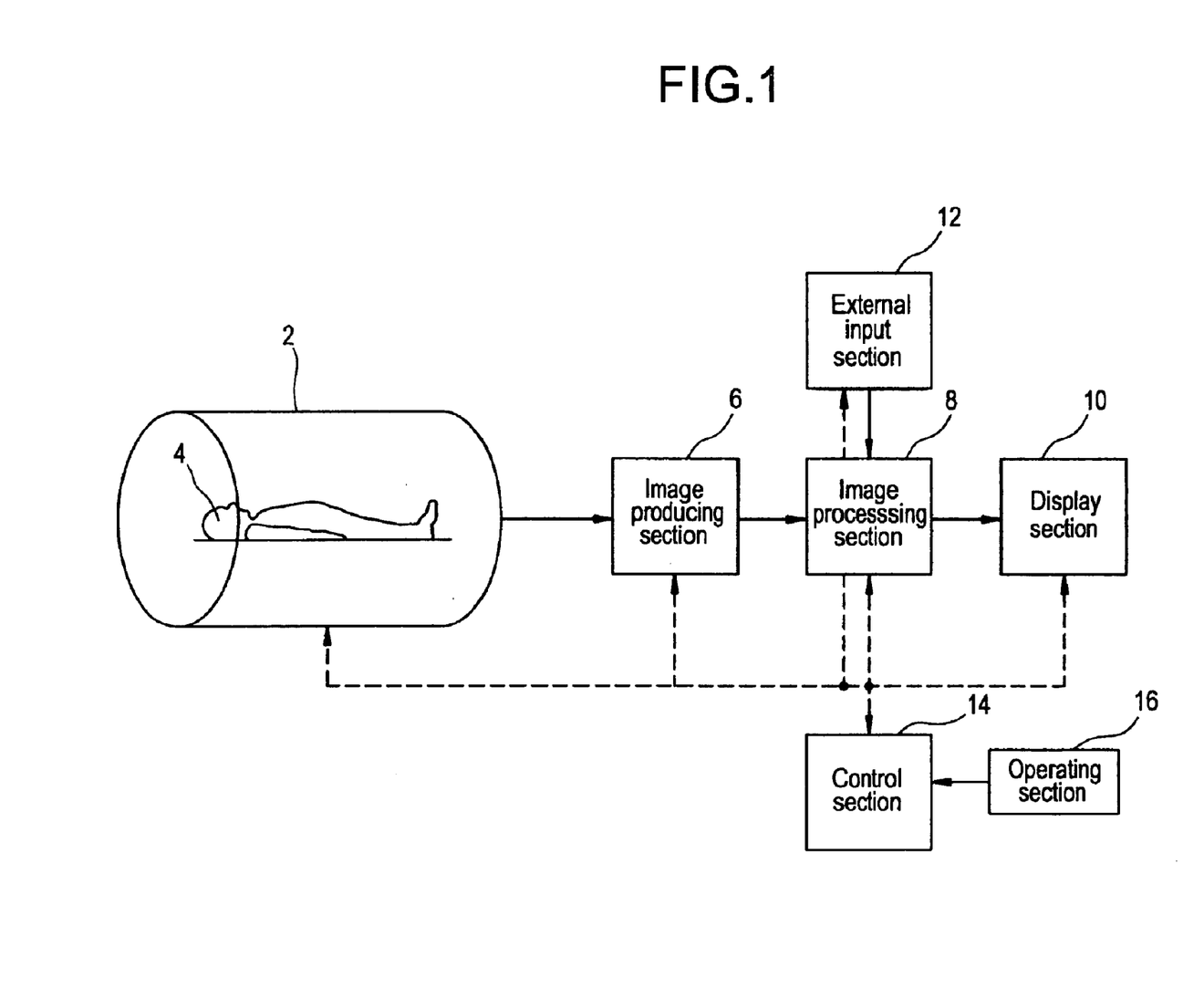
FIG. 1 is a block diagram of an apparatus in accordance with one embodiment of the present invention.

The present invention will now be described in more detail with reference to embodiments shown in the accompanying drawings. FIG. 1 shows a block diagram of a medical imaging apparatus which is one embodiment of the present invention. The configuration of the apparatus represents an embodiment of the apparatus in accordance with the present invention, and the operation of the apparatus represents an embodiment of the method in accordance with the present invention.

As shown in FIG. 1, the present apparatus has a signal acquisition section 2 for acquiring a signal from a subject 4 for producing a medical image. The signal acquisition section 2 may be used in several forms according to the type of the medical imaging apparatus.

For example, an X-ray CT apparatus employs a gantry comprising an X-ray emanating/detecting system for scanning the subject 4. An MRI apparatus employs a magnet system for acquiring a signal from the subject 4 using magnetic resonance. An ultrasonic imaging apparatus employs an ultrasonic probe for transmitting ultrasound into the subject 4 and receiving its echo. In any case, such existing signal acquisition section 2 can be utilized. In other medical imaging apparatuses, their respective conventional signal acquisition sections 2 may be used according to the type of the apparatus.

The signal acquisition section 2 is connected to an image producing section 6, and inputs the signal acquired from the subject 4 to the image producing section 6. The image producing section 6 produces an image based on the signal input from the signal acquisition section 2. The signal acquisition section 2 and the image producing means 6 together represent one embodiment of the medical image acquisition means in accordance with the present invention.

The image producing section 6 also may be used in several forms according to the type of the medical imaging apparatus. For example, the X-ray CT apparatus employs an apparatus (for example, a computer) for backprojecting projection data for a plurality of views of the subject 4 and reconstructing a tomographic image. The MRI apparatus employs an apparatus (for example, a computer) for reconstructing an image by an inverse Fourier transformation on a magnetic resonance signal. The ultrasonic imaging apparatus employs an apparatus for generating a B-mode image or the like based on the intensity of ultrasonic echoes. In any case, such existing image producing section 6 can be utilized. In other medical imaging apparatuses, their respective conventional image producing sections 6 may be used according to the type of the apparatus.

The image producing section 6 is connected with an image processing section 8 for processing the image produced by the image producing section 6 and producing an image suitable for display. The image processing section 8 represents one embodiment of the image processing means in accordance with the present invention. The image processing section 8 is comprised of, for example, a computer. Detailed description of the configuration of the image processing section 8 will be made later.

The image processing section 8 is connected with a display section 10 for displaying the image output from the image processing section 8 and other information. The image display section 10 represents one embodiment of the display means in accordance with the present invention. The image display section 10 is comprised of, for example, a graphic display.

The image processing section 8 is also connected with an external input section 12 for inputting a program or data etc. to the image processing section 8. The external input section 12 may be any appropriate device according to the type of an input information medium, such as an optical disk playback device, i.e., a so-called CD-ROM (compact disk read only memory) drive, an MO (magnetic optical) disk drive, and an FDD (flexible disk drive). Besides, if the input information is distributed via a network such as Internet, a corresponding communication device is used as the external input section 12.

The signal acquisition section 2, the image producing section 6, the image processing section 8, the display section 10 and the external input section 12 are each connected to a control section 14. The control section 14 is comprised of, for example, a computer. The control section 14 supplies control signals to the above-listed sections to control their operation. Similarly, the control section 14 is supplied with status information signals or the like from these sections.

The control section 14 is connected with an operating section 16 which allows an operator to input several commands and information etc. The operating section 16 is comprised of, for example, an operation panel that has a keyboard, a pointing device such as a mouse, and other operating devices. A portion consisting of the image processing section 8, the display section 10, the control section 14 and the operating section 16 represents one embodiment of the data processing apparatus in accordance with the present invention. While description will be made with reference to an example in which the data processing apparatus is a data processing apparatus for a medical imaging apparatus, the data processing apparatus is not limited thereto but may be a general data processing apparatus such as a personal computer or an engineering workstation.

Figure 2:
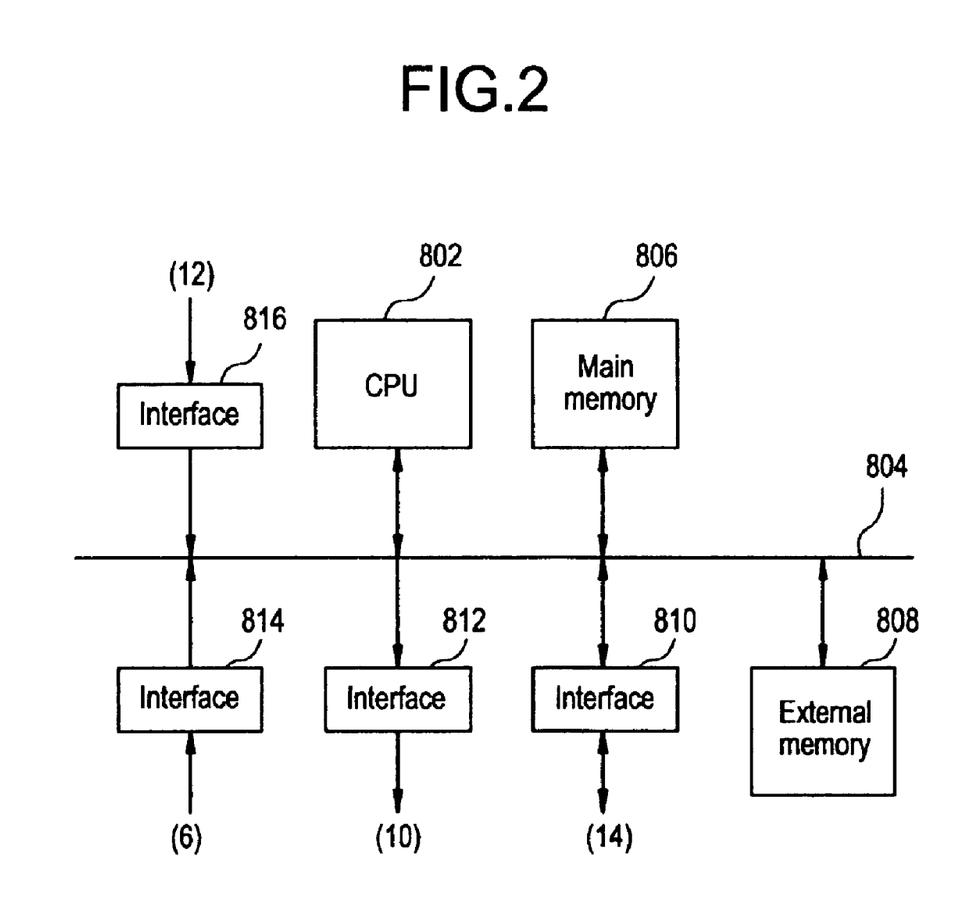
FIG. 2 is a block diagram of an image processing section in the apparatus shown in FIG. 1.

FIG. 2 shows a block diagram of the image processing section 8. As shown, the image processing section 8 has a CPU (central processing unit) 802. The CPU 802 is connected with a main memory 806, an external memory 808 and interfaces 810, 812, 814, 816 via a bus 804. The CPU 802, the main memory 806 and the external memory 808 together represent one embodiment of the license information creating means in accordance with the present invention. They also represent one embodiment of the program executing means of the present invention.

The main memory 806 is comprised of, for example, a RAM (random access memory). The external memory 808 is comprised of, for example, a HDD (hard disk drive). The interfaces 810, 812, 814 and 816 are for use with the control section 14, the display section 10, the image producing section 6 and the external input section 12, respectively.

The external memory 808 stores an image processing program and other several programs executed by the CPU 802. These programs are installed from the external input section 12 via the interface 816. The external memory 808 also stores image data input from the image producing section 6 via the interface 814. The external memory 808 furthermore stores data (conditional data) prescribing conditions for applying several kinds of processing to the image data. The conditional data may be specified and changed from the operating section 16 via the control section 14 and the interface 810. The image stored in the external memory 808 is supplied to the display section 10 via the interface 812 and can be displayed as a visual image.

Figure 3A:
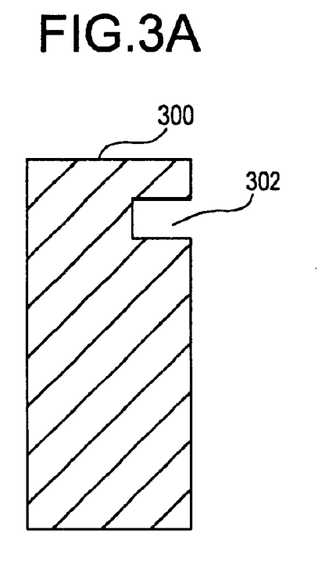
FIG. 3 is a diagram conceptually illustrating a program in the apparatus shown in FIG. 1.
Figure 3B:
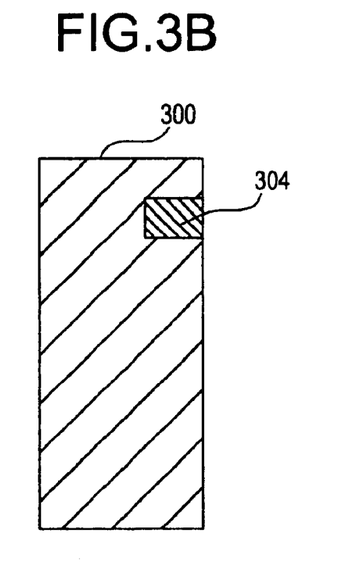

Of the programs installed in the external memory 808, a diagram of a program to which measures to prevent illegitimate duplication is applied is conceptually shown in FIG. 3. As shown in FIG. 3(a), the program 300 is installed with a blank portion 302 partially lacking information. The program 300 is incomplete with the blank portion 302, and acts properly only when license information 304 is filled in this portion as shown in FIG. 3(*b*).

The license information 304 used may be user-specific information such as a machine serial number of the present apparatus. The user-specific information is not limited to the machine serial number but may be a device address in a network such as Ethernet; in other words, may be any information that is unique to the user. The license information 304 represents one embodiment of the license information in accordance with the present invention.

The license information 304 is stored in the external memory 808 in the form of a run-time read module of an OS (operating system) of the CPU 802, separately from the program 300. The run-time read module, which is also known as a shared library or a dynamic link library, is ordinarily separated from the program body, but is incorporated for use into the program body by reading it during the execution of the program and then is separated when the program is terminated.

The license information 304 is created by a dedicated creation program. The creation program is self-destructive, that is, it is destroyed by itself after being executed only once. Moreover, the creation program self-destructs when it is read for duplication or the like. The creation program is distributed attached to the program 300.

If the program 300 is distributed using a medium such as a CD-ROM or MO, the creation program is separately distributed using, for example, a flexible magnetic disk (FD). If the program 300 is distributed on-line via a network, the creation program may be separately distributed on-line. Since the license information 304 is significantly small as a module and hence the creation program is small, the creation program is easy to distribute via an FD or electronic mail (E-mail).

Figure 4:
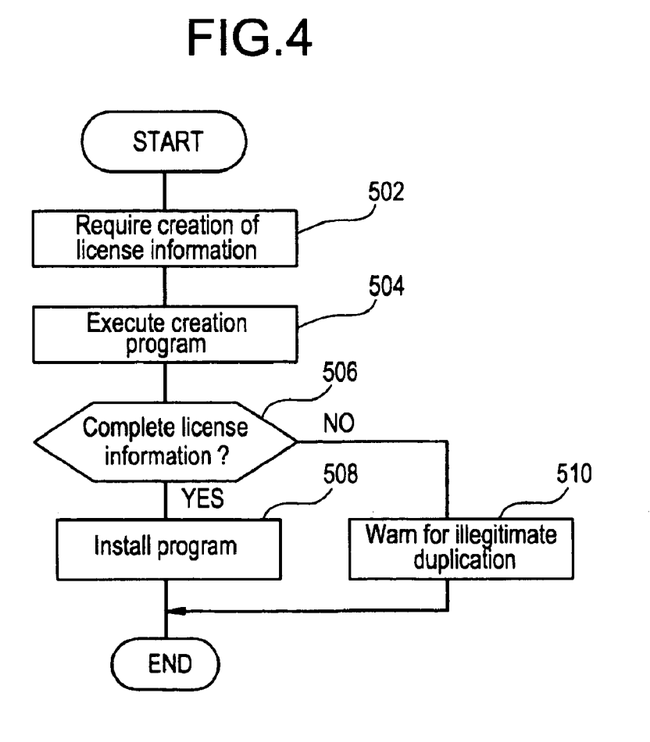
FIG. 4 is a flow chart of a procedure to install the program shown in FIG. 3.

Now the operation of the apparatus will be described. The operation of the apparatus proceeds under control of the control section 14 based on a command issued by the operator via the operating section 16. FIG. 4 shows a flow chart of the operation of the present apparatus in installing the program.

When the operator starts installation of the program 300, the operator is required via the display section 10 to create the license information at Step 502. Then, the operator executes the creation program provided via, for example, an FD at Step 504. The creation program creates the user-specific license information 304 in the form of a run-time read module, and stores it in a predefined address. Since the license information is thus automatically created by the creation program, the operator need not manually input complicated code information unlike the conventional procedure. The creation program self-destructs after it creates the license information 304.

Then, decision is made at Step 506 whether the license information 304 is completed. If so, installation of the program 300 is performed at Step 508. The program 300 after the installation has the blank portion 302 as shown in FIG. 3(*a*) and is incomplete in itself. Therefore, if the program 300 is read from the memory for duplication, the duplicated program does not act properly on other apparatuses. That is, illegitimate duplication of the program 300 can be substantially prevented.

When the program 300 is executed on the present apparatus after the installation, the program 300 reads the license information 304 as a run-time read module during the execution. This enables the program 300 to operate as a complete program with the blank portion 302 filled with the license information 304, and the program can perform its proper action.

Since the license information 304 is a run-time read module, a run-time read module management function generally provided in an OS can be fully utilized when the program 300 uses the information. Therefore, because the program 300 need not incorporate a special procedure to use the license information 304, there is no increase in the processing time associated with the use of the license information 304.

Moreover, since any part of the program 300 is not rewritten by the user, instability of the operation is avoided. Furthermore, since the program 300 can be easily saved on a backup medium, it is easy to recover the program 300 even if failure should occur. It will be easily recognized that the program 300 saved on the backup medium is invalid on apparatuses other than the present apparatus.

Even if a stranger or the like attempts to install the program 300 in a similar apparatus other than the present apparatus after the program 300 is installed in the present apparatus, it is impossible to create the license information because the license information creation program has self-destructed. Accordingly, the program 300 cannot be installed, thereby preventing illegitimate duplication of the program 300. Moreover, in this case, a warning is given for the illegitimate duplication at Step 510 in the flow chart shown in FIG. 4. In addition, since the creation program self-destructs if one attempts to duplicate the creation program, it is impossible to previously make illegitimate duplication of the creation program.

It should be noted that the program 300 may be distributed, for example, as a trial version to which mimetic license information is added, allowing the function of the program 300 to be executed partially or entirely within a limited period. This allows a user to verify the main feature of the program 300 using the trial version to previously examine whether the program 300 deserves to be employed. After making a formal agreement, the user is given the license information creation program and is allowed to use the entire function of the program 300 without limitation.

Figure 5:
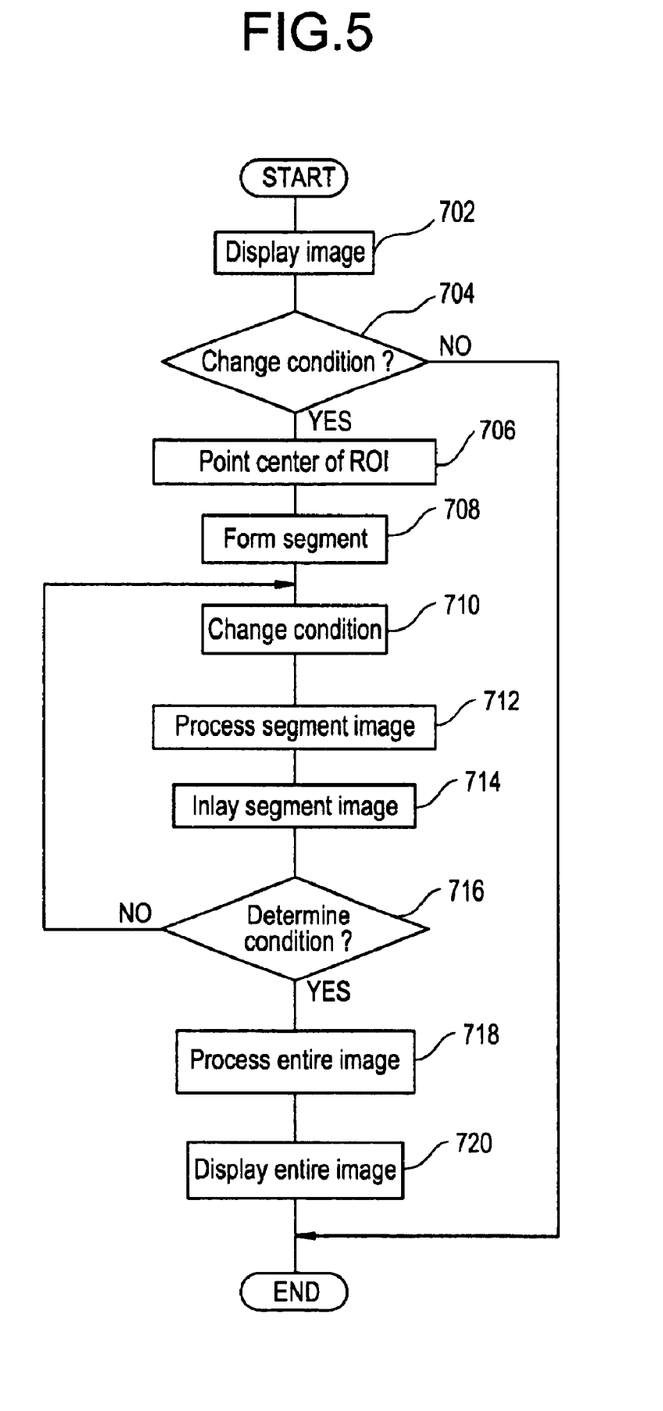
FIG. 5 is a flow chart of the operation of the apparatus shown in FIG. 1.
Figure 6A:
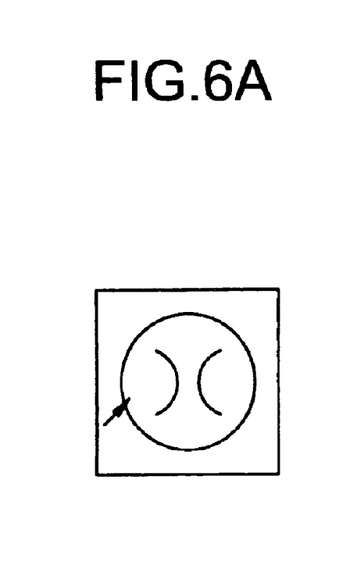
FIG. 6 is a schematic diagram of image display by the apparatus shown in FIG. 1.
Figure 6B:
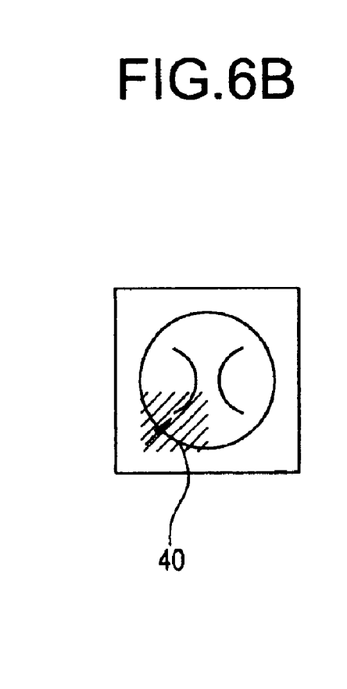
Figure 6C:
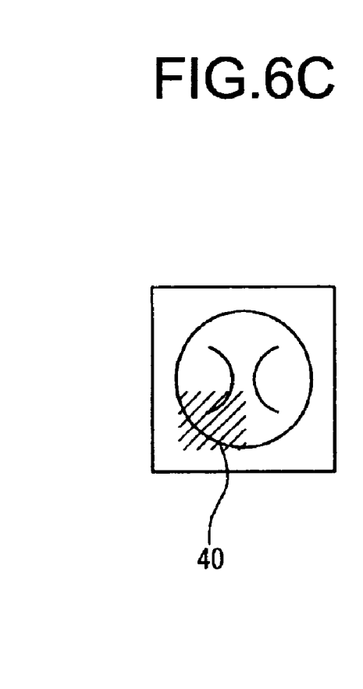
Figure 6D:
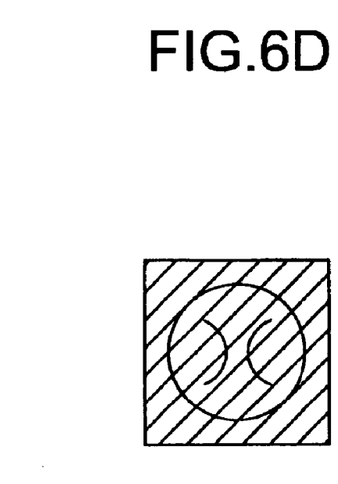

The operation of the present apparatus will now be described with reference to an example in which the program 300 is an image processing program. FIG. 5 shows a flow chart of the operation of the present apparatus. On activating the image processing program, the license information as described above is read and incorporated in the program, resulting in a complete image processing program.

First, at Step 702, the operator operates the operating section 16 to invoke a desired image to display on the display section 10. Accordingly, a screen image as exemplarily shown in FIG. 6(*a*) is displayed on the display section 10. The drawing schematically illustrates a screen showing a tomographic image of the brain.

Next, at Step 704, the operator observes the image to determine whether an image processing condition need to be changed. For example, when the gray-level resolution in a region of interest (ROI) in the image is not sufficient to discriminate the lesion site or the like, which implies the possibility of an inappropriate window width or window level for image processing, a change is made on the image processing condition, i.e., the window width and the window level. If the displayed image is satisfactory as displayed, the operation described hereinafter will not be performed.

Next, at Step 706, the center of the ROI is specified by a pointing device such as a mouse. That is, the center of the ROI is pointed by a pointer designated as an arrow, and a mouse button is pressed. In response to the specification of the center of the ROI, the image processing section 8 generates a predefined segment 40 including the ROI center at Step 708, as exemplarily shown in FIG. 6(*b*) as a hatched area.

The segment 40 has a size such that an image processing as described hereinafter on image data contained therein can be completed in 100 ms at longest, for example, and preferably within 30 ms. When the entire screen is comprised of a matrix of 512×512, for example, such segment is a matrix of the order of 256×256.

Next, at Step 710, the operator makes a change on the image processing condition. If the window width and level are to be changed in this example, the window width is increased or decreased, for example, by moving the mouse in the right or left direction with the mouse button pressed, and the window level is increased or decreased by moving the mouse in the forward or backward direction. It will be easily recognized that the adjustment of the window width and level is not limited to being performed by the mouse but may be performed by any appropriate operating device.

In response to such change in the window width and level, the image processing section 8 performs a window change processing on the image data pertinent to the segment 40 at Step 712. At Step 714, the processed image is inlaid into the segment 40 on the screen, and is displayed along with the unprocessed portion.

Thus, the image in the segment 40 is one that reflects the change in the window width and level, as exemplarily shown in FIG. 6(*c*). Since the image processing on the segment 40 associated with the condition change is performed within a period of about 30 ms, for example, an image can be displayed reflecting a continuous condition change in real-time.

The operator continues to adjust the window width and level while observing such an image until a satisfactory image is obtained in the segment 40. This is shown as a loop of Step 710 through 716 in the flow chart. Since the result of the condition change is reflected on the image in real-time, the adjustment can be efficiently carried out. When a satisfactory image is obtained in the segment 40, the operator releases the mouse button. At this time, the image processing condition is determined. Alternatively, the determination of the processing condition may be done by an appropriate key operation.

In response to the determination of the window width and level, at Step 718, the image processing section 8 performs the window change processing on the image data for the entire screen image using the specification values finally determined, and displays the processed image on the display section 10 at Step 720. As exemplarily shown in FIG. 6(*d*), the entire screen image is thus displayed with the suitable window width and level.

Such image processing is performed on each of desired images. When the processing on all the images is completed and the program is terminated, the license information is separated from the program body.

Many widely different embodiments of the invention may be configured without departing from the spirit and the scope of the present invention. It should be understood that the present invention is not limited to the specific embodiments described in the specification, except as defined in the appended claims.

What is claimed is:

1. An illegitimate duplication prevention method comprising the steps of:

starting process of installing a particular software program in a particular apparatus, said particular software program having a blank area for insertion of identification information in form of a module independently of a program body, and remaining areas for holding said program body which is provided independently of said identification information;

executing a dedicated creation program provided in a memory, said creation program automatically creating an identification information uniquely for that said particular apparatus in form of a run-time read module and storing said identification information in a predefined address, and self destructing said creation program after one execution in creating said unique identification information;

deciding whether said identification information is valid for said particular apparatus; and when said identification information is valid, installing said particular software having said remaining areas filled with said program body in said particular apparatus and causing said run-time read module to be inserted into said blank area of said software program; and then said particular apparatus executing said particular software program having said program body and said run-time read module with said identification information inserted in said blank area; and wherein in the event said particular software program having said program body and filled blank area is read for duplication by an apparatus other than said particular apparatus, the duplicated software program will not act properly for the said other apparatus because the blank area will not be filled with an appropriate run-time read module having an appropriate identification information for the other apparatus; and wherein said run-time read module is separated from said blank area of said particular software program when the program is terminated.

2. A data processing apparatus comprising:

means for starting process of installing a particular software program in a particular apparatus, said particular software program having a blank area for insertion of identification information in form of a module independently of a program body, and remaining areas for holding said program body which is provided independently of said identification information;

means for executing a dedicated creation program provided in a memory, said creation program automatically creating an identification information uniquely for that said particular apparatus in form of a run-time read module and storing said identification information in a predefined address, and self destructing said creation program after one execution in creating said unique identification information;

means for deciding whether said identification information is valid for said particular apparatus; and when said identification information is valid, installing said particular software having said remaining areas filled with said program body in said particular apparatus and causing said run-time read module to be inserted into said blank area of said software program; and then said particular apparatus executing said particular software program having said program body and said run-time read module with said identification information inserted in said blank area; and wherein in the event said particular software program having said program body and filled blank area is read for duplication by an apparatus other than said particular apparatus, the duplicated software program will not act properly for the said other apparatus because the blank area will not be filled with an appropriate run-time read module having an appropriate identification information for the other apparatus; and means for separating said run-time read module from said blank area of said particular software program when the program is terminated.

3. A medical imaging apparatus comprising medical image acquisition means for acquiring an image of a subject, image processing means for processing said image, and display means for displaying said processed image, wherein said image processing means comprises:

means for starting process of installing a particular software program in a particular apparatus, said particular software program having a blank area for insertion of identification information in form of a module independently of a program body, and remaining areas for holding said program body which is provided independently of said identification information;

means for executing a dedicated creation program provided in a memory, said creation program automatically creating an identification information uniquely for that said particular apparatus in form of a run-time read module and storing said identification information in a predefined address, and self destructing said creation program after one execution in creating said unique identification information;

means for deciding whether said identification information is valid for said particular apparatus; and when said identification information is valid, installing said particular software having said remaining areas filled with said program body in said particular apparatus and causing said run-time read module to be inserted into said blank area of said software program; and then said particular apparatus executing said particular software program having said program body and said run-time read module with said identification information inserted in said blank area; and wherein in the event said particular software program having said program body and filled blank area is read for duplication by an apparatus other than said particular apparatus, the duplicated software program will not act properly for the said other apparatus because the blank area will not be filled with an appropriate run-time read module having an appropriate identification information for the other apparatus; and means for separating said run-time read module from said blank area of said particular software program when the program is terminated.

* * * * *